UNITED STATES PATENT OFFICE 2,464,675

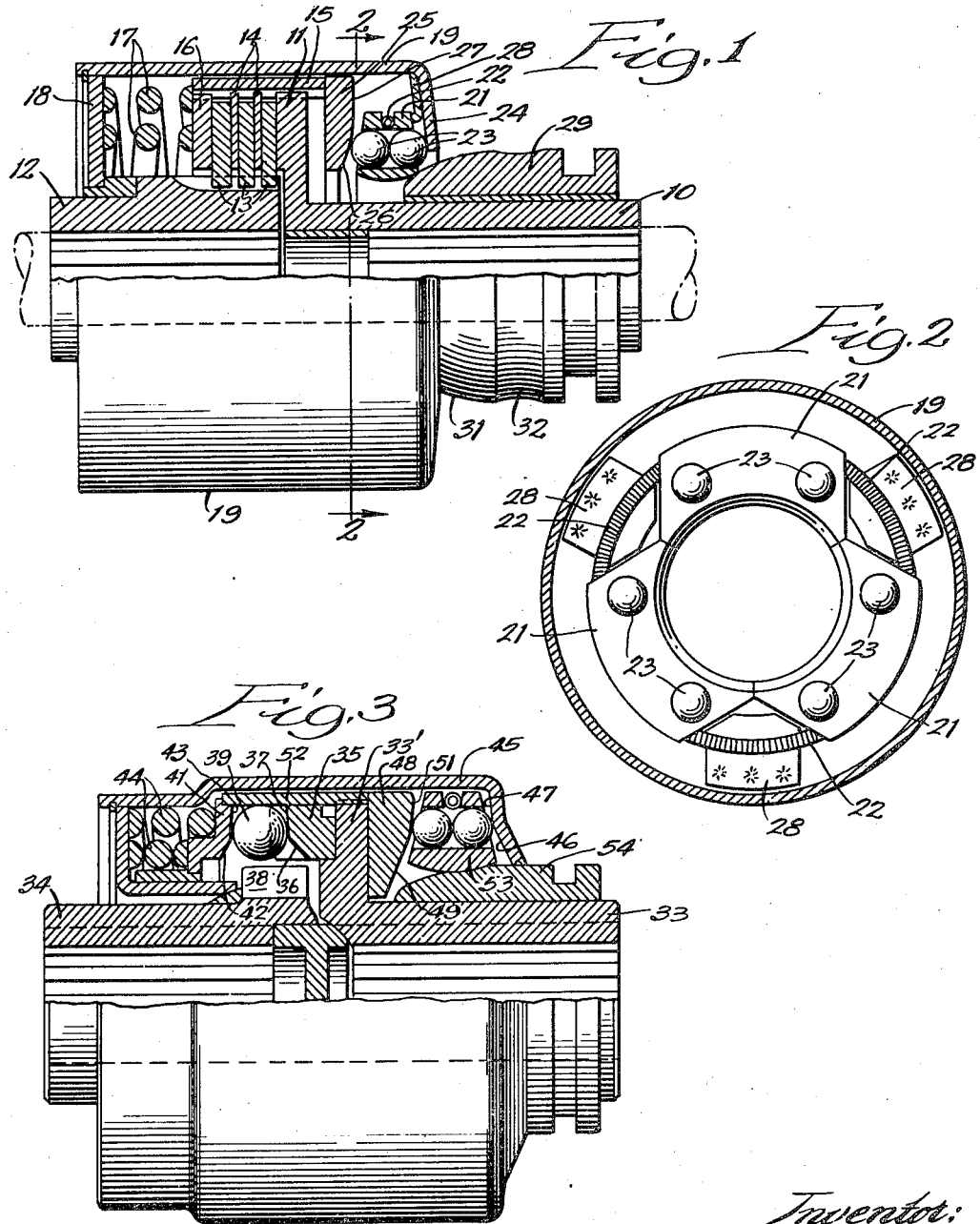
March 15, 1949.  A. Y. DODGE  2,464,675
SPEED RESPONSIVE CLUTCH
Filed Sept. 28, 1945
Inventor:
Adiel Y. Dodge,
By Dawson, Borthen Hungerberg,
Attorneys.

SPEED RESPONSIVE CLUTCH

Adiel Y. Dodge, Rockford, Ill.

Application September 28, 1945, Serial No. 619,142

14 Claims. (Cl. 192—104)

This invention relates to speed responsive clutches and more particularly to clutches which will disengage upon the attainment of a predetermined speed.

One of the objects of the invention is to provide a clutch which will positively disengage upon reaching a predetermined speed with a minimum of slipping.

Another object is to provide a clutch which will disengage upon reaching a predetermined speed and which will not re-engage until it reaches a lower predetermined speed.

Still another object is to provide a clutch which will disengage in response to a combination of speed and torque and which will over-run with a minimum of drag once it is disengaged.

Still another object is to provide a clutch which is simple and inexpensive to manufacture and which requires no thrust bearings.

The above and other objects and advantages of the invention will be more readily apparent from the following description when read in connection with the accompanying drawing, in which—

Figure 1 is an axial section through a clutch embodying the invention;

Figure 2 is a section on the line 2—2 of Figure 1; and

Figure 3 is a view similar to Figure 1 of an alternative construction.

The clutch of Figures 1 and 2 comprises a clutch sleeve 10 adapted to be connected to a driving shaft and terminating at its inner end in a radially extending flange 11. A second clutch sleeve 12 is adapted to be connected to a driven shaft coaxial with the driving shaft.

The clutch members are adapted to be connected by clutch elements shown as interleaved friction discs 13 and 14, the discs 13 being splined to the clutch member 12 and the discs 14 being similarly splined to a cylinder 15 connected to the flange 11. A ring 16 is secured by a stepped spline to one end of the cylinder 15 to transmit both torque and thrust therebetween and is adapted to move toward the flange 11 to press the clutch disc together. When the clutch discs are in engagement, they will connect the flange 11 to the clutch member 12, thereby to connect the two shafts.

The discs are adapted to be pressed together by one or more springs 17 engaging the ring 16 at one end. At their opposite ends the springs 17 abut against a ring 18 secured to one end of a housing 19 which encloses the clutch parts and which is adapted to rotate with the clutch member 10. If desired to insure rotation of the housing with the clutch member 10, the housing may be keyed or splined to the cylinder 15.

To disengage the clutch centrifugal means responsive to the speed of the driving member 10 are provided to move the rings 16 against the springs 17. As shown, the centrifugal means comprise a series of weights 21 arranged in annular array within the housing 19 and movable outward in response to centrifugal force. The weights are preferably grooved at their periphery to receive a garter spring 22 which normally holds them in the position shown in Figure 1. The weights are formed with one or more axial bores in which a plurality of anti-friction balls 23 are loosely arranged, the balls preferably being in even numbers so that a true rolling action is obtained without any sliding or scuffing.

The weights move between an inturned end 24 on the housing 19, which preferably lies at a slight angle to a radius, and a cam ring 25 which is movable axially in the housing. The cam ring in the housing. The cam ring is connected to the cylinder 15 and is formed on the surface adjacent the end 24 with a cam surface which forms an acute angle with the shaft axes at its inner portion as indicated at 26 and which becomes more nearly parallel to the end 24 at its outer portion as indicated at 27.

The weights are guided in their movement and are caused to rotate positively with the housing 19 by guide members 28 secured to the housing and engaging the ends of the weights. As best seen in Figure 2, the ends of the weights are parallel and engage parallel surfaces on the guide members 28. By this means the weights are held properly spaced at all times and are caused to rotate with the housing 19 without interfering with the outward movement. In operation of the clutch at rest or at low speed, the parts will occupy the position shown with the weights in and with the springs 17 pressing the clutch discs into engagement. As the speed increases, the weights tend to move out until at a predetermined speed, depending upon the strneght of the springs and the angle of the cam surfaces, the weights will start to move out. Once the outward motion of the weights is started, they will move to their extreme outer position due to their increasing radius of rotation and to increasing mechanical advantage over the spring resulting from the changing cam angle. Thus the clutch will disengage positively with a minimum of slipping and when once disengaged will remain disengaged until its speed is reduced to a lower value than that required to initiate movement of the weights. This is due to the relatively flat cam angle which is effective when the weights are in their outer position.

When the speed is reduced, the weights will move inward rapidly, positively and quickly to bring the clutch discs back into engagement due to the fact that the mechanical advantage of the spring over the weights increases as the weights move in. This rapid engagement minimizes wear on the clutch discs and provides a positive clutch engaging action.

In order that the clutch can be disengaged manually when desired regardless of speed, a cam collar 29 is provided slidable on the clutch member 10 and adapted to be moved through a yoke or the like not shown. At its inner end the collar is formed with a tapered wedged surface 31 increasing from a minimum to a maximum diameter. A slight groove as indicated at 32 is preferably provided adjacent the maximum diameter portion of the collar.

With the collar moved out to the position shown in Figure 1, the weights are free to move in so that the clutch can engage. When the collar is slid to the left, the cam surface 31 will engage the inner edges of the weights and move them out to disengage the clutch regardless of speed. When the collar has moved to its extreme left position, the inner rounded edges of the weights will fit into the groove 32 so that the collar will tend to stay in its inner position to hold the clutch disengaged.

The embodiment shown in Figure 3 comprises a driving clutch member 33 and a driven clutch member 34 adapted to be connected respectively to driving and driven shafts. The clutch member 33 is formed with a radial flange 33' carrying a hardened ring 35 which is formed in one face with a series of grooves. The grooves terminate at their bottoms in inner cam surfaces 36 forming an acute angle with the axis of the clutch members and at their outer portions 37 in substantially radial surfaces.

The clutch member 34 is formed in its periphery with a series of notches 38 having diverging sides and spaced to register with the notches in the ring 35 in at least one relative position of the clutch members. The notches are adapted to receive balls 39 which are moved inward by the cam surfaces 36 and 37 into the notches 38 to connect the clutch members. The balls are urged into the notches by a ring 41 slidably axially of the members and formed with an inner cam surface 42 at an acute angle to the axis and an outer substantially radial cam surface 43. The ring is urged toward the balls by springs 44 which engage one end of a housing 45 enclosing the clutch parts.

The opposite end of the housing 45 is turned in to form an inner cam surface 46 at an acute angle to the axis of the members and an outer cam surface 47 at a smaller angle than the surface 46. Spaced from the surfaces 46 and 47 is a cam ring 48 having an inner cam surface 49 at an acute angle to the axis and an outer cam surface 51 at a smaller angle than the surface 49. The ring 48 is connected to the ring 41 by a cylinder 52 so that when the ring 48 is moved the ring 41 will move against the springs 44.

A plurality of weights 53 similar to the weights 21 of Figures 1 and 2 are arranged between the cam surfaces to move outward in response to centrifugal force. It will be understood that the weights 53 are guided and connected to the housing 45 which in turn rotates with the clutch member 33 in the same manner as in Figures 1 and 2.

For manually disengaging the clutch, a cam collar 54 is slidably arranged on the clutch member 33 and is formed with an inner wedged shaped end to engage the inner edges of the weights and move them outwardly to the position shown. When the collar 54 is moved to the right, the weights 53 will move in permitting the clutch to engage.

When the clutch is engaged, the balls 39 will be moved radially inward to engage the notches 38 so that the clutch members will be connected through the notches and the balls. As the torque increases to a predetermined high value, the cam action of the notches 38 on the balls will move them out to the position shown in Figure 3 to disconnect the clutch members. The initial part of this movement requires a relatively high torque since the balls are urged inward by the cam surfaces 36 and 42 with a relatively high degree of force. After the balls have been moved out, however, they engage the flatter cam surfaces 37 and 43 so that the camming action tending to move the balls in is substantially reduced and so that the balls will be held out by the action of centrifugal force thereon. At the same time, the weights 53 will move out into engagement with the relatively flat cam surfaces 47 and 51 so that a relatively low speed will hold the weights out and will hold the ring 41 to the left.

It will be seen that in the operation of this clutch, torque and speed are both effective on the balls 39 to move them out and speed is effective on the weights 53 to urge them out. The force exerted by the weights 53 in effect reduces the strength of the springs 44 so that the balls will be cammed out of the notches 38 with relatively small torque. Thus this clutch is responsive to a combination of speed and torque to disengage and will be held out of engagement by speed alone to minimize drag.

While two embodiments of the invention have been shown and described in detail herein, it will be understood that these are for the purpose of illustration only and are not to be taken as a definition of the scope of the invention, reference being had for this purpose to the appended claims.

What is claimed is:

1. A speed responsive clutch for connecting driving and driven shafts comprising clutch members carried by the shafts respectively, clutch parts connected to the members and adapted to engage to connect the clutch members, a ring movable axially of the members to urge the clutch parts into engagement in one position and to permit the clutch parts to disengage in another position, a spring urging the ring toward said one position, speed responsive means rotatable with one of the clutch members to urge the ring toward said other position, and manually operable means to move the speed responsive means at will thereby to move the ring toward said other position.

2. A speed responsive clutch for connecting driving and driven shafts comprising clutch members carried by the shafts respectively, clutch parts connected to the members and adapted to engage to connect the clutch members, a ring movable axially of the members to urge the clutch parts into engagement in one position and to permit the clutch parts to disengage in antoher position, a spring urging the ring toward said one position, weights rotatable with one of the clutch members and movable outward in response to the speed thereof, means forming substantially radial cam surfaces between which the weights move and connected to the ring to move it toward said other position when the weights move out, one of the cam surfaces lying at an acute angle to the shaft axes at its inner portion and becoming substantially radial at its outer portion, and manual means to move the weights out at will.

3. A speed responsive clutch for connecting driving and driven shafts comprising clutch members carried by the shafts respectively, clutch parts connected to the members and adapted to engage to connect the clutch members, a ring movable axially of the members to urge the clutch parts into engagement in one position and to permit the clutch parts to disengage in another position, a spring urging the ring toward said one position, weights rotatable with one of the clutch members and movable outward in response to the speed thereof, means forming substantially radial cam surfaces between which the weights move and connected to the ring to move it toward said other position when the weights move out, one of the cam surfaces lying at an acute angle to the shaft axes at its inner portion and becoming substantially radial at its outer portion, and a cam collar movable axially of said one of the clutch members and engageable with the weights to move them out.

4. A spaced responsive clutch for connecting driving and driven shafts comprising clutch members carried by the shafts respectively, clutch parts connected to the members and adapted to engage to connect the clutch members, a ring movable axially of the members to urge the clutch parts into engagement in one position and to permit the clutch parts to disengage in another position, a spring urging the ring toward said one position, weights rotatable with one of the clutch members and movable outward in response to the speed thereof, a housing inclosing the weights and formed at one end with a cam surface engaging the weights, the housing inclosing and forming an abutment for the spring, a cam ring slidable in the housing connected to the first named ring and having a cam surface engaging the weights, one of the cam surfaces lying at an acute angle to the shaft axis at its inner portion and becoming substantially radial at its outer portion.

5. A speed responsive clutch for connecting driving and driven shafts comprising clutch members carried by the shafts respectively, clutch parts connected to the members and adapted to engage to connect the clutch members, a ring movable axially of the members to urge the clutch parts into engagement in one position and to permit the clutch parts to disengage in another position, a spring urging the ring toward said one position, weights rotatable with one of the clutch members and movable outward in response to the speed thereof, a housing inclosing the weights and formed at one end with a cam surface engaging the weights, the housing inclosing and forming an abutment for the spring, a cam ring slidable in the housing connected to the first named ring and having a cam surface engaging the weights, one of the cam surfaces lying at an acute angle to the shaft axis at its inner portion and becoming substantially radial at its outer portion, and a cam collar slidable axially of said one of the clutch members and engaging the weights to move them out.

6. A speed responsive clutch for connecting driving and driven shafts comprising clutch members connectible to the shafts respectively, clutch parts connected to the members and adapted to engage to connect the members, a ring movable axially of the members to urge the clutch parts into engagement in one position and to permit them to disenage in another position, a housing rotatable with one of the clutch members and inclosing the clutch parts, a spring engaging one end of the housing and the ring to urge the ring toward one position, a cam ring spaced from the other end of the housing and connected to the first named ring, a plurality of weights mounted in annular array between the cam ring and the other end of the housing, the cam ring and the other end of the housing forming an acute angle with each other at their inner portions and becoming substantially parallel at their outer portions, and a spring engaging the weights and urging them inward.

7. A speed responsive clutch for connecting driving and driven shafts comprising clutch members connectible to the shaft respectively, clutch parts connected to the members and adapted to engage to connect the members, a ring movable axially of the members to urge the clutch parts into engagement in one position and to permit them to disengage in another position, a housing rotatable with one of the clutch members and inclosing the clutch parts, a spring engaging one end of the housing and the ring to urge the ring toward one position, a cam ring spaced from the other end of the housing and connected to the first named ring, a plurality of weights mounted in annular array between the cam ring and the other end of the housing, the cam ring and the other end of the housing forming an acute angle with each other at their inner portions and becoming substantially parallel at their outer portions, and guide means slidably connecting the weights to the housing for rotation therewith.

8. A speed responsive clutch for connecting driving and driven shafts comprising clutch members connectible to the shafts respectively, clutch parts connected to the members and adapted to engage to connect the members, a ring movable axially of the members to urge the clutch parts into engagement in one position and to permit them to disengage in another position, a housing rotatable with one of the clutch members and inclosing the clutch parts, a spring engaging one end of the housing and the ring to urge the ring toward one position, a cam ring spaced from the other end of the housing and connected to the first named ring, a plurality of weights mounted in annular array between the cam ring and the other end of the housing, the cam ring and the other end of the housing forming an acute angle with each other at their inner portions and becoming substantially parallel at their outer portions, and a cam collar slidable axially into the housing and engageable with the inner surfaces of the weights to move them outward.

9. A speed responsive clutch for connecting driving and driven shafts comprising clutch members connected to the shafts respectively, clutch elements movably carried by one of the clutch members and engageable with the other to connect them, the clutch members and elements being so constructed and arranged that the elements tend to move out of engagement with said other of the clutch members in response to torque, a ring movable axially of one of the clutch members and engaging the elements to move them into engagement with the other member, a spring urging the ring toward the clutch elements, a cam ring connected to the first named ring to urge it away from the elements, and a centrifugal weight acting on the cam ring to move it, the weight and cam ring being so constructed and arranged that the weight has a greater mechanical advantage over the ring when in an inner position than when in an outer position.

10. A speed responsive clutch for connecting driving and driven shafts comprising clutch members connected to the shafts respectively, clutch elements movably carried by one of the clutch members and engageable with the other to connect them, the clutch members and elements being so constructed and arranged that the elements tend to move out of engagement with said other of the clutch members in response to torque, a ring movable axially of one of the clutch members and engaging the elements to move them into engagement with the other member, a spring urging the ring toward the clutch elements, a cam ring connected to the first named ring to urge it away from the elements, means forming a cam surface adjacent the cam ring, a series of weights between the cam surface and the adjacent cam surface of the cam ring, said cam surfaces lying at an acute angle to each other at their inner portions and becoming substantially parallel at their outer portions.

11. A speed responsive clutch for connecting driving and driven shafts comprising clutch members connected to the shafts respectively, clutch elements movably carried by one of the clutch members and engageable with the other to connect them, the clutch members and elements being so constructed and arranged that the elements tend to move out of engagement with said other of the clutch members in response to torque, a ring movable axially of one of the clutch members and engaging the elements to move them into engagement with the other member, a spring urging the ring toward the clutch elements, a cam ring connected to the first named ring to urge it away from the elements, means forming a cam surface adjacent the cam ring, a series of weights between the cam surface and the adjacent cam surface of the cam ring, said cam surfaces lying at an acute angle to each other at their inner portions and becoming substantially parallel at their outer portions, and an axially movable cam collar engageable with the inner surfaces of the weights to cam them outward.

12. A speed responsive clutch comprising coaxial clutch members, a flange on one of the clutch members formed with end notches terminating in cam bottoms lying at an acute angle to the axis at their inner portions and becoming more nearly radial at their outer portions, the other member being formed with peripheral notches to register with the notches in the flange, balls in the first named notches to be cammed into engagement with the last named notches by the cam bottoms, a ring engaging the balls and urging them toward the flange, a spring urging the ring toward the balls, and means responsive to the speed of one of the members to urge the ring away from the balls.

13. A speed responsive clutch comprising coaxial clutch members, a flange on one of the clutch members formed with end notches terminating in cam bottoms lying at an acute angle to the axis at their inner portions and becoming more nearly radial at their outer portions, the other member being formed with peripheral notches to register with the notches in the flange, balls in the first named notches to be cammed into engagement with the last named notches by the cam bottoms, a ring engaging the balls and urging them toward the flange, a spring urging the ring toward the balls, a housing against one end of which the spring abuts, the other end of the housing forming an annular cam surface, a cam ring formed with an annular cam surface facing the first named surface and connected to the first named ring to move it, and a series of weights between the cam surfaces movable outward in response to centrifugal force, the cam surfaces lying at an acute angle to each other at their inner portions and becoming more nearly parallel at their outer portions.

14. A speed responsive clutch comprising coaxial clutch members, a flange on one of the clutch members formed with end notches terminating in cam bottoms lying at an acute angle to the axis at their inner portions and becoming more nearly radial at their outer portions, the other member being formed with peripheral notches to register with the notches in the flange, balls in the first named notches to be cammed into engagement with the last named notches by the cam bottoms, a ring engaging the balls and urging them toward the flange, a spring urging the ring toward the balls, a housing against one end of which the spring abuts, the other end of the housing forming an annular cam surface, a cam ring formed with an annular cam surface facing the first named surface and connected to the first named ring to move it, a series of weights between the cam surfaces movable outward in response to centrifugal force, the cam surfaces lying at an acute angle to each other at their inner portions and becoming more nearly parallel at their outer portions, and a manually movable cam collar engageable with the weights to cam them outward.

ADIEL Y. DODGE.

REFERENCES CITED

The following references are of record in the file of this patent:

UNITED STATES PATENTS

| Number | Name | Date |
|---|---|---|
| 1,105,408 | Dechamps | July 28, 1941 |
| 2,203,117 | Whatmough | June 4, 1940 |

FOREIGN PATENTS

| Number | Country | Date |
|---|---|---|
| 2,236 | Netherlands | Nov. 1, 1917 |
| 72,682 | Austria | Nov. 10, 1916 |
| 303,437 | Germany | Jan. 1918 |